US006886651B1

(12) United States Patent
Slocum et al.

(10) Patent No.: US 6,886,651 B1
(45) Date of Patent: May 3, 2005

(54) MATERIAL TRANSPORTATION SYSTEM

(75) Inventors: Alexander H. Slocum, Bow, NH (US);
Shorya Awtar, Cambridge, MA (US);
Anastasios John Hart, Somerville, MA
(US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/337,097

(22) Filed: Jan. 6, 2003

Related U.S. Application Data
(60) Provisional application No. 60/346,491, filed on Jan. 7, 2002.

(51) Int. Cl.$^7$ ............................ B60T 7/16; B62D 61/02; B60K 17/00; B60L 13/04; B61C 11/00
(52) U.S. Cl. ...................... 180/167; 180/221; 180/342; 104/281; 104/282; 104/283; 105/78
(58) Field of Search ........................... 180/7.1, 21, 235, 180/901, 167, 342, 221; 104/281, 282, 283, 284, 285, 286, 287, 288; 105/78; 301/6.5; 192/40, 84.1

(56) References Cited

U.S. PATENT DOCUMENTS

| 2,694,164 A | 11/1954 | Geppelt | |
| 3,157,243 A | * 11/1964 | Sellner | ..................... 180/333 |

(Continued)

FOREIGN PATENT DOCUMENTS

| DE | 2521410 A1 | * 11/1976 | ................. 180/221 |
| DE | 2933451 A1 | * 2/1981 | ................. 180/221 |
| EP | 0200837 | 11/1986 | |
| EP | 0212024 A1 | 3/1987 | |
| EP | 0256996 A2 | 2/1988 | |
| EP | 0831000 A1 | 3/1998 | |
| GB | 2029246 A | * 3/1980 | .......... A63H/33/26 |
| GB | 2088225 A | * 6/1982 | ................. 180/221 |
| JP | 362268782 A | * 11/1987 | .......... B62D/57/02 |
| JP | 405277062 A | * 10/1993 | ............ A61B/1/00 |
| JP | 08123550 A | 5/1996 | |
| JP | 09242836 A | * 9/1997 | .......... F16H/13/12 |
| RU | 2 051 058 C1 | 12/1995 | |
| SU | 1320740 A1 | 6/1987 | |
| WO | 87/00500 | * 1/1987 | ................. 180/221 |

OTHER PUBLICATIONS

Slocum et al.; "Backend Automation in the Semiconductor Industry;" Future Fab International Issue 12—Test Assembly & Packaging; Feb., 2002; Section 10 (11 sheets).

Slocum et al.; "Appendix A: Comparison of Overhead Track-Based Transportation Concepts;" Future Fab International Issue 11—Test Assembly & Packaging; Oct. 2001; (1 sheets).

Slocum, Alexander H., Awtar, Shorya and Hart, John; "Magnabots—A Magnetic Wheels Based Overhead Transportation Concept;" Presented at the 2$^{nd}$ International Federation of Automatic Control Conference on Mechatronic Systems; held Dec. 9–11, 2002; Berkley California, USA.

*Primary Examiner*—Christopher R. Ellis
*Assistant Examiner*—G B Klebe
(74) *Attorney, Agent, or Firm*—Daly, Crowley, Mofford & Durkee, LLP

(57) ABSTRACT

A material transportation system includes one or more material transportation vehicles, each having magnetic wheels coupled to a magnetically attractive surface that can include a ceiling, a wall, a floor, and/or a transition region. The material transportation vehicles are adapted to carry material from place to place. Each material transportation vehicle has sensors and motor controls that reduce swing motion of the material transportation vehicle and the material coupled thereto. A collision avoidance and traffic control system prevents collisions between the one or more material transportation vehicles.

14 Claims, 6 Drawing Sheets

U.S. PATENT DOCUMENTS

| | | | |
|---|---|---|---|
| 3,275,091 A | * 9/1966 | Steck et al. | 180/24.12 |
| 3,343,621 A | * 9/1967 | Doorne | 180/342 |
| 3,690,393 A | 9/1972 | Guy | |
| 3,810,515 A | 5/1974 | Ingro | |
| 3,960,229 A | 6/1976 | Shio | |
| 4,010,636 A | 3/1977 | Clark et al. | |
| 4,196,639 A | * 4/1980 | Spodig | 476/11 |
| 4,429,488 A | * 2/1984 | Wessels | 446/446 |
| 4,531,460 A | 7/1985 | Pamer | |
| 4,602,567 A | 7/1986 | Hedstrom | |
| 4,613,804 A | 9/1986 | Swenson | |
| 4,632,038 A | 12/1986 | Lawrence | |
| 4,781,120 A | 11/1988 | Farrow et al. | |
| 4,926,544 A | 5/1990 | Koyanagi et al. | |
| 4,990,117 A | * 2/1991 | Yonezawa | 446/136 |
| 5,049,218 A | 9/1991 | Martin | |
| 5,170,351 A | 12/1992 | Nemoto et al. | |
| 5,203,265 A | * 4/1993 | Nii et al. | 105/29.1 |
| D346,767 S | 5/1994 | Fujita | |
| 5,329,449 A | 7/1994 | Tanizawa et al. | |
| 5,355,807 A | * 10/1994 | Pelrine et al. | 105/78 |
| 5,454,328 A | 10/1995 | Matsuzaki et al. | |
| 5,467,718 A | 11/1995 | Shibata et al. | |
| 5,492,066 A | 2/1996 | Nozaki et al. | |
| 5,511,487 A | 4/1996 | Sakagami et al. | |
| 5,551,350 A | 9/1996 | Yamada et al. | |
| 5,647,718 A | 7/1997 | Wiesler et al. | |
| 5,671,680 A | 9/1997 | DelGreco | |
| 5,781,437 A | 7/1998 | Wiemer et al. | |
| 5,831,841 A | 11/1998 | Nishino | |
| 5,853,655 A | 12/1998 | Baker | |
| 5,907,491 A | 5/1999 | Canada et al. | |
| 5,924,180 A | 7/1999 | Lindner et al. | |
| 5,934,198 A | 8/1999 | Fraser | |
| 5,957,586 A | 9/1999 | Okamoto et al. | |
| 5,983,803 A | 11/1999 | Eberle | |
| 6,002,104 A | 12/1999 | Hsu | |
| 6,019,563 A | 2/2000 | Murata et al. | |
| 6,036,427 A | 3/2000 | Kita et al. | |
| 6,095,054 A | 8/2000 | Kawano et al. | |
| 6,109,568 A | 8/2000 | Gilbert et al. | |
| 6,125,955 A | 10/2000 | Zoretich et al. | |
| 6,266,577 B1 | 7/2001 | Popp et al. | |
| 6,688,938 B1 | * 2/2004 | Lee | 446/129 |
| 6,762,524 B2 | * 7/2004 | Six | 310/103 |
| 6,793,026 B1 | * 9/2004 | De Fazio | 180/8.3 |
| 2002/0094752 A1 | * 7/2002 | Kaneko et al. | 446/466 |

* cited by examiner

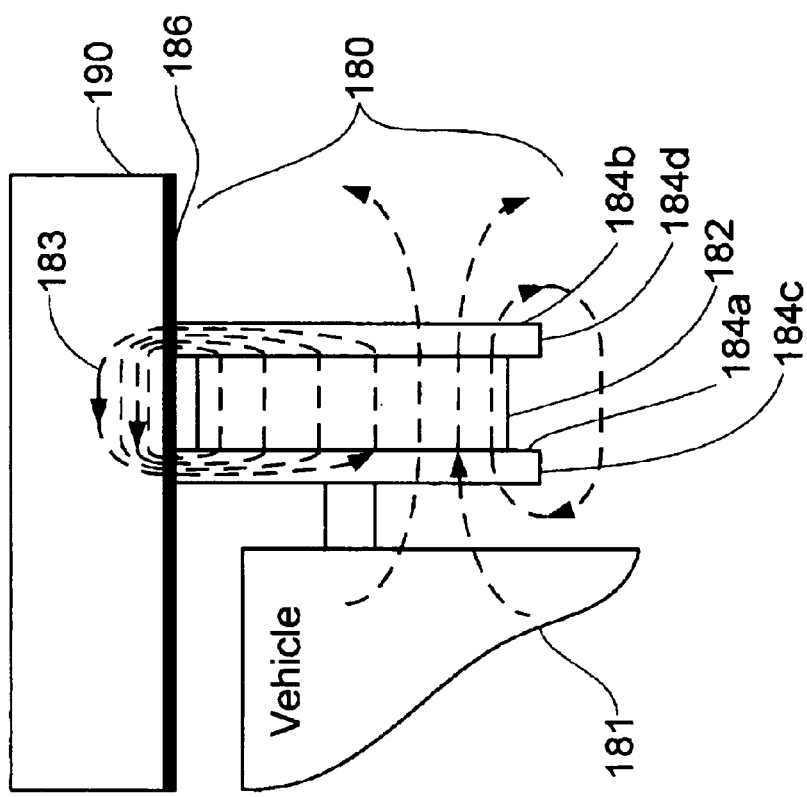
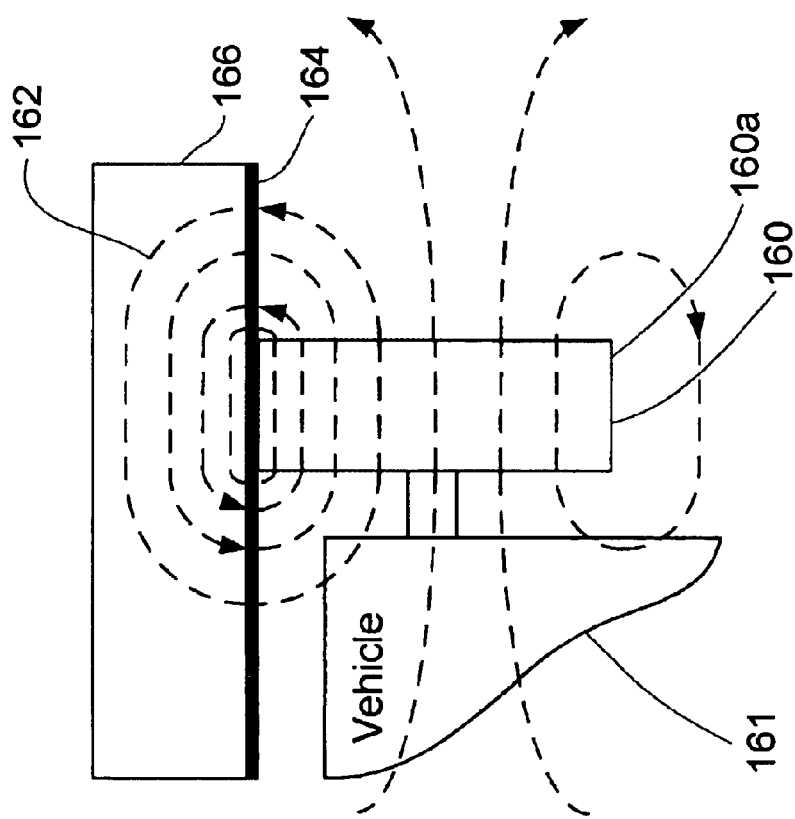
FIG. 5A
FIG. 5

MATERIAL TRANSPORTATION SYSTEM

CROSS REFERENCE TO RELATED APPLICATIONS

This application claims the benefit of U.S. Provisional Application No. 60/346,491 filed Jan. 7, 2002 which application is hereby incorporated herein by reference in its entirety.

STATEMENT REGARDING FEDERALLY SPONSORED RESEARCH

Not Applicable.

FIELD OF THE INVENTION

This invention relates generally to automated material transportation systems and more particularly to a trackless automated material transportation system with vehicles having magnetic wheels.

BACKGROUND OF THE INVENTION

In many areas of manufacturing, both production volume and product variety have increased. At the same time, many products have become increasingly complex and, therefore, require complex manufacturing processes. Though manufacturing has become increasingly complex, manufacturing must maintain profitability. Profitable manufacturing requires high yields, shorter lead times, and improved equipment utilization.

Automated material transportation is an important aspect of factory efficiency and resulting profit because it reduces costly manual labor, speeds the production process, reduces inventory, and reduces the payback time on expensive manufacturing equipment that can quickly become obsolete. In contrast, manual material transportation is costly and slow. Furthermore, human factors limit the ease by which a manual material transportation arrangement can be expanded and contracted to meet a variation in manufacturing throughput or product. Consequently, as production grows in volume and size, many industries desire simple and efficient automated material handling (AMH) systems.

As used herein, the term material handling, or material transportation, can refer to a variety of material handling tasks, including, but not limited to, moving simple piece parts from one place to another, and also to an entire production line, including assembly steps and movement of progressively assembled items.

The automobile industry uses automated material transportation in the form of a moving assembly line, making the manufacturing more efficient and resulting products less expensive. Production volumes and profits are greatly improved as a result of the efficient assembly line of material flow.

The semiconductor manufacturing industry also uses automated material transportation. An industry-wide collaborative effort backed by the SEMATECH consortium provides interface and architecture standards for semiconductor manufacturing equipment. The standardization of equipment for wafer fabrication plants has helped to increase semiconductor industry growth. The success provided by standardization of semiconductor manufacturing equipment shows the importance of defining standard interfaces and protocols for manufacturing equipment. With such standardization, a variety of material handling equipment and components, made by a variety of manufacturers, can work together to achieve a material handling task.

Hospitals and clinical labs lack an appropriate automated material handling system, yet are facing increases in the amount of material that requires transport. In hospitals, the material can consist of a wide variety of items. Many hospitals desire automated material transportation for transport of samples, transport of reports and documents (e.g., patient records), transport of instruments, and even transport of patients. Some hospitals have installed pressurized airchute systems for transporting documents, yet these systems are expensive, limited in path extent, require operator attention at each transfer, and are unable to transport the variety of payloads mentioned above. Hospitals have also shown interest in the development of futuristic operation theaters (OT), which incorporate automated reconfiguration of machines, equipment, and lights; and automated transfer of samples and instruments. Standard interfaces for automated material handling systems can make the same system infrastructure able to transport material throughout hospitals, and position equipment in more limited areas such as in operation theatres.

Many general use automated material handling systems, though used for a variety of material handling tasks, still can only be applied to a specific industry. There is a growing need for automated material transportation systems that can have a general use, beyond a particular industry.

While a particular automated material handling (AMH) system might make economic sense for one particular industry, often the same system is not the optimum choice for a different industry. For example, the automated material handling systems used by semiconductor manufacturers for wafer processing of integrated circuits (ICs) are specifically designed to be suitable for use in cleanrooms. However, even a related industry, the Testing, Assembly & Packaging (TAP) industry that compliments IC manufacturing (or is a separate part of a single semiconductor fabrication facility), is not able to use the clean room AMH systems because they do not meet the economic constraints and flexibility requirements of the TAP operations. Most existing AMH systems are specifically tailored to particular applications, rendering them of little general use.

Since the need for automated material handling pertains to a wide range of industries, it would be desirable to provide a relatively inexpensive yet highly versatile general purpose automated material handling system. It would, therefore, be desirable to provide an automated material handling system that can be used in a wide variety of applications, for transport of a wide variety of types of material.

SUMMARY OF THE INVENTION

In accordance with the present invention, a material transportation system includes a magnetically attractive surface and one or more material transportation vehicles. Each of the one or more material transportation vehicles has two magnetic drive wheels, each coupled to the magnetically attractive surface. Each of the one or more material transportation vehicles also has a mechanical interface coupled to the two wheels via a chassis, and adapted to carry material. Each of the one or more material transportation vehicles has a wheel control system that controls its motion, including its pitch. The one or more material transportation vehicles can be coupled to a collision avoidance and traffic control system capable of causing the one or more material transportation vehicles to avoid collisions with one another and to avoid other obstacles.

With this particular arrangement, the automated material transportation system has material transportation vehicles adaptable to transport a variety of types of material from one place to another. No vehicle tracks are required, thus the system is easily adaptable to changes in production floor layout and/or building layout.

In accordance with another aspect of the present invention, a method for material transportation includes tracking the position of the one or more material transportation vehicles, computing collision avoidance and traffic control information, and transmitting the collision avoidance and traffic control information to the one or more material transportation vehicles to control the movement of the material transportation vehicles and to avoid collisions.

With this particular arrangement, the method provides the ability to have multiple material transportation vehicles, the number and course of which can be changed from time to time, while avoiding collisions between the one or more material transportation vehicles.

In accordance with yet another aspect of the present invention, a building includes a magnetically attractive surface (e.g., on a ceiling, wall, and/or floor) for use in a magnetically attractive trackless and wireless material transportation system.

With this particular arrangement, a building is provided having a material transportation system adaptable to a wide variety of material payloads and a wide variation of building layouts.

BRIEF DESCRIPTION OF THE DRAWINGS

The foregoing features of the invention, as well as the invention itself may be more fully understood from the following detailed description of the drawings, in which:

FIG. 5 is a cross sectional view of an exemplary magnetic wheel that can be used as part of the material transportation vehicle of FIG. 4;

FIG. 5A is a cross sectional view of an alternate embodiment of a magnetic wheel that can be used as part of the material transportation vehicle of FIG. 4.

DETAILED DESCRIPTION OF THE INVENTION

Figure 1:
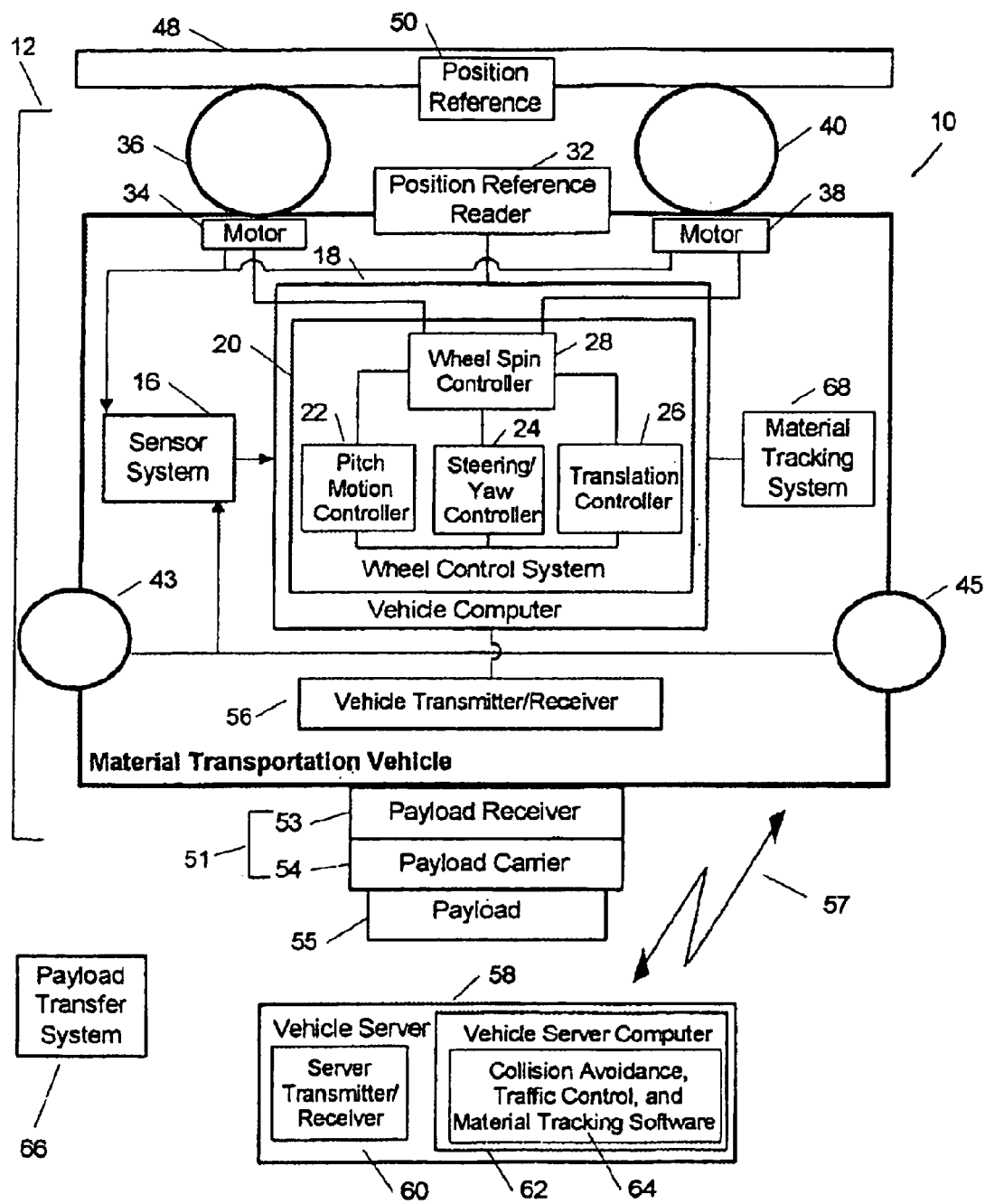
FIG. 1 is a block diagram of an exemplary material transportation system in accordance with the present invention.

Referring now to FIG. 1, a material transportation system 10 includes one or more material transportation vehicles 12, only one of which is shown in FIG. 1 for simplicity in the drawing and ease of explanation. The material transportation vehicle 12 includes a sensor system 16 coupled to a vehicle computer 18. The sensor system 16 can include a variety of sensors, including, but not limited to, accelerometers, rate gyros, inclinometers, optical encoders, and proximity sensors.

The vehicle computer 18 includes a wheel control system 20, which includes a vehicle pitch motion controller 22, a vehicle steering/yaw controller 24, and a vehicle translation controller 26, each of which are coupled both to each other and to a wheel spin controller 28. The wheel spin controller 28 is coupled to a first wheel motor 34 that drives a first wheel 36, and to a second wheel motor 38 that drives a second wheel 40. The wheel motors 24, 38 are coupled to the sensor system 16. Each of the wheel motors 34, 38 can include a drive amplifier, which is not shown. The system 10 can also include one or more position reference readers 32 only one of which is shown in FIG. 1 for simplicity in the drawing and ease of explanation. Each of the one or more position reference readers 32 is coupled to the vehicle computer 20.

In one particular embodiment, each of the wheels 36, 40 is a magnetic wheel 36, 40, each coupled to a magnetically attractive surface 48. The magnetic wheels 36, 40 thus remain in contact with the magnetically attractive surface 48 regardless of the orientation of the magnetically attractive surface 48, here shown to be horizontal. The magnetically attractive surface 48 can include one or more position references 50 disposed thereon. It should be appreciated that although the position references 50 are here shown disposed on the magnetically attractive surface and the position readers 32 are shown on the vehicle, the reverse could also be true. That is, in some cases it may be desirable or even necessary to couple the position references to the vehicle and to couple the position readers 32 to the magnetically attractive surface, or more generally to the building which includes the magnetically attractive surface. The position references may be provided as bar codes, radio frequency identification (RFID) tags, sonar beacons, or any other type of local positioning reference. Other positioning techniques may also be used. For example, positioning by dead-reckoning via signals from the sensor system, and correction of the dead-reckoned position using position information gathered from the references can be used. Also, position references can be on the payload transfer station, etc. Also, obstacles can contain references (e.g. RFID tags) as warning beacons.

The material transportation vehicle 12 can also include one or more idler rollers 43, 45 each of which may be coupled to the sensor system 16. Each of the one or more idler rollers 43, 45 and each of the wheel motors 34, 38 can include a respective rotation sensor (not shown), each of which is a part of the sensor system 16 and provides information about rotation of the idler rollers 43, 45 and wheel motors 34, 38 to the vehicle computer 18, during operation. In one particular embodiment, the rotation sensors are optical encoders. In addition, the idler rollers may include a contact (continuity) sensor which tells if the idler rollers are in contact with the magnetically attractive surface.

A material payload 55 (or more simply a "payload"), can be coupled to the material transportation vehicle 12 via a payload interface 51 which is here shown to be comprised of a payload receiver 53 and a payload carrier 54. The vehicle 12 couples to the payload 55 and transports the payload from a first location (e.g. an origin) to a second location (e.g. a destination) within the material transportation system 10.

Each of the material transportation vehicles 12 can also include a vehicle transmitter/receiver 56 (which may, for example, be provided as an RF transmitter/receiver or a wireless LAN transmitter/receiver) coupled to the vehicle computer 18. The vehicle transmitter/receiver 56 communicates via a communication link 57 with a vehicle server 58. Although the link 57 is here shown as a wireless communication link, in some embodiments it may be necessary to utilize a wired communication link. One of ordinary skill in the art will understand that the communication link 57 can be provided on a variety of RF bands, including, but not limited to the industrial, scientific, medical (ISM) bands and frequency bands associated with IEEE 802.11a, 802.11b, and 802.15 (Bluetooth). It will also be understood that the communication link 56 can have one or more of a variety of communication protocols, including, but not limited to lower-level TCP/IP protocols such as those accommodated by IEEE 802.11a, 802.11b, and 802.15, as well as higher-level messaging protocols defined for a specific implementation of the material transportation system.

The vehicle server 58 includes a server RF transmitter/receiver 60 coupled to a vehicle server computer 62 that can contain collision avoidance and traffic control software 64. In an alternate arrangement, the communication link 57 is an infrared (IR) communication link, the vehicle RF transmitter/receiver 52 is an IR transmitter/receiver, and the server RF transmitter/receiver 60 is an IR transmitter/receiver.

The vehicle server 58 can communicate with the one or more material transportation vehicles 12, either one at a time or in simultaneous communications to more than one material transportation vehicle 12 (e.g. the vehicle server can operate in a "broadcast mode"). In an alternate embodiment, each material transportation vehicle 12 can also communicate, via respective vehicle transmitter/receivers, for example, the vehicle transmitter/receiver 56, directly with others of the one or more material transportation vehicles on other communication links (not shown). In one embodiment, the system can be provided having a network of vehicles with each vehicle having a unique network address. The vehicle network address can be such that the vehicle is accessible by appropriate authorization anywhere on the Internet. Also, the system can be programmed to provide proximity based services (e.g. find the nearest vehicle). The server 58 can also include provisions for task prioritization, management of vehicle traffic, and for tracking and management of vehicle payloads.

The material transportation system 10 can also include a payload transfer station 66 at which the material payload 55 can be loaded or unloaded. The payload transfer station 66 allows for automated or manual transfer of payloads (e.g., payload 55) to and from the material transportation vehicle 12. The material can be loaded or unloaded manually by a person or, in an alternate embodiment the material can be loaded or unloaded automatically by a machine (not shown). For example, when the material transportation vehicle 12 approaches an empty payload transfer station 66, the payload receiver 53 may decouple from the payload carrier 54 to leave the payload carrier 54 and payload 55 at the transfer station 66 for subsequent unloading from the station. In another example, a material transportation vehicle 12 not having a payload carrier 54 may approach a payload transfer station 66 and accept a payload carrier 54 containing a payload 55. In another example, a material transportation vehicle 12 may approach and "wait" at a payload transfer station 66 while a payload 55 is loaded into the payload carrier 54.

In operation, the wheel spin controller 28 receives control signals from the vehicle translation controller 26, and controls the wheel motors 34, 38 and the wheels 36, 40 coupled thereto, to provide translation of the material transportation vehicle 12 towards a destination. By controlling the direction and speed at which the wheels 36, 40 spin, the wheel spin controller 28 guides the material transportation vehicle 12 towards the destination, in response to control signals received from the vehicle steer controller 24. Wheel spin controller 28 also receives pitch motion control signals from the pitch motion controller 22 and hence also controls the pitch motion of the material transportation vehicle 12.

The material transportation vehicle 12 can move from one location to another along any appropriate magnetic surface. The magnetic surface 48 may be provided, for example, as a ceiling and/or a wall and/or a floor. When moving on a ceiling, the material transportation vehicle 12, and the payload 55 coupled thereto are in a pendulum configuration. The material transportation vehicle 12, having the two magnetic wheels 36, 40 has a tendency to swing about the central axis of the two magnetic wheels 36, 40 when suspended below the magnetically attractive surface 48. The material transportation system 10 can suppress, or otherwise control the swing motion of the material payload 55 as it moves along a ceiling, by way of control of the spin of the two magnetic wheels 36, 40 provided by the vehicle pitch motion controller 22. The swing motion and the swing motion control are further described below in conjunction with FIGS. 4 and 6.

In contrast, when moving on a wall, both the wheels 36, 40 and at least one idler roller 43, 45 are in contact with a stable surface (e.g. the wall). This may be more clearly seen in FIG. 3. Thus, in the case where the vehicle 12 is moving on a wall, the material transportation vehicle 12 and the material payload 55 coupled thereto are in a substantially stable configuration, since the swing motion of the material transportation vehicle 12 is reduced or eliminated by the idler rollers 43, 45 which can come in contact with and roll along the wall as the material transportation vehicle 12 moves along the wall. Therefore, when moving on a wall, pitch motion control by the vehicle computer 18 is not required.

When moving on the ground, the material transportation vehicle 12 can either use the idler rollers 43, 44 in conjunction with the wheels 36, 40 to achieve pitch stability or can operate in an inverted pendulum configuration. In both cases, the material payload 55 is above the material transportation vehicle 12. In the first case, no pitch motion control is required, while in the latter case, the vehicle computer 18 can keep the material transportation vehicle 12 and the material payload 55 balanced by way of control of the spin of the two magnetic wheels 36, 40 via the pitch motion controller 22.

The sensor system 16, in combination with the vehicle computer 18, can identify the configuration of the material transportation vehicle 12 as being in the pendulum, stable, or inverted pendulum configuration. In accordance therewith, the vehicle pitch motion controller 22 operates in a swing suppression mode, a deactivated mode, or a balancing mode, respectively.

While one material transportation vehicle 12 is shown, it will be understood that a plurality of material transportation vehicles 12 can be provided by this invention, each material transportation vehicle 12 coupled to the magnetically attractive surface 48. Each material transportation vehicle 12 can have the same source and destination locations or different source and destinations locations. Thus, the material transportation vehicles are susceptible to collisions with each other, or with other obstacles such as building support columns that obstruct certain areas of the pathway surface.

The position reference reader 32 is responsive to the one or more position references 50 disposed on the magnetically attractive surface. The position references 50 provide position information, thus the position reference reader 32 derives position information therefrom, and provides the information to the vehicle computer 18. The position reference reader 32 may provide the vehicle position to the vehicle computer 18, or the vehicle computer 18 may use the information from the position reference reader 32 to compute the vehicle position. The vehicle computer 18 provides the vehicle position information to the vehicle server processor 62 via the vehicle RF transmitter/receiver 52, the communication link 56, and the server RF transmitter/receiver 60. In an alternate embodiment, the position references 50 are disposed on the material transportation vehicles 12, and the position reference readers 32 are disposed in appropriate locations in the building, near the magnetically attractive surface 48. The readers gather the position information from the references, and transmit the information (via an independent communication link, not shown) to the respective vehicle computers or to the vehicle server.

Collision avoidance and traffic control software 64 analyzes the position information to detect possible collision paths among the plurality of material transportation vehicles, and issues control commands that cause the vehicles to avoid the possible collision paths. The control commands are communicated to the vehicle computer 18 via the server RF transmitter/receiver 60, the communication link 56, and the vehicle RF transmitter/receiver 52.

In operation, the collision avoidance and traffic control software 64 commands the material transportation vehicle 12 to move from an origination to a destination or to move from a destination to an origination; and to turn, decelerate, accelerate, or otherwise change its movement to efficiently complete the desired transportation task while avoiding collisions with other material transportation vehicles. The collision avoidance and traffic control software 64 also keeps the vehicle 12 from exceeding the boundaries of the magnetically attractive surface, from hitting stationary obstacles in proximity to the magnetically attractive surface 48, and from entering safety zones.

While the vehicle server 58 provides central collision avoidance and traffic control software 64, it will be appreciated that in an alternate embodiment, collision avoidance and traffic control software can be distributed instead among the plurality of material transportation vehicle 12. With this particular arrangement, no vehicle server 58 need be provided. Instead, the material transportation vehicles 12 communicate position information directly with each other via communication links (not shown), avoiding collisions by way of distributed collision avoidance and traffic control software.

In one particular embodiment, the vehicle computer 18 is pre-programmed to go from a particular origination to a particular destination. In an alternate embodiment, the origination and destination are communicated to the vehicle computer 18 by the vehicle server processor 62. In a variation of these embodiments, the material tracking system 68 reads information from the payload 55 and transmits it to the vehicle computer. This information is used to determine the destination of the payload, and the program that directs the vehicle to the destination is derived in the vehicle computer or received from the vehicle server, based on this information from the payload.

While a vehicle server 58 is shown, it should be appreciated that, in other embodiments, a portable wireless user interface, for example a wireless personal digital assistant (PDA), can be used to directly communicate to the material transportation vehicles 12 or to the vehicle server 58, allowing a user to either remotely control or query information (e.g. position, payload data) from the material transportation vehicle 12 or to remotely effect the vehicle server 58 respectively.

Control of the material transportation vehicle 12, and, in particular, swing motion control of the material transportation vehicle 12 provided by the vehicle computer 18, varies in accordance with a variety of factors. The factors include, but are not limited to, an orientation angle (not shown) of the magnetically attractive surface 48 relative to horizontal, and the mass and center of gravity of the material transportation vehicle 12 and the material payload 55. It is desirable that the material transportation vehicle 12 be able to control motion, including swing motion, for a variety of orientation angles associated with the magnetically attractive surface 48, and for a variety of masses and centers of gravity associated with the material transportation vehicle 12 and the material payload 55. Robust performance may be achieved using classical or state-space control techniques for a given set of orientation angles associated with the magnetically attractive surface 48 and a given set of masses and centers of gravity. However, an adaptive control method can also be used in association with the material transportation vehicle 12 and the material payload 55 to allow more significant variation in the orientation angle of the magnetically attractive surface 48. In this case, the sensor system 16 may contain sensors which enhance the ability of the vehicle computer to determine values of appropriate quantities, such as mass and orientation of the magnetically attractive surface, on which to adapt its control algorithms.

Figure 2:
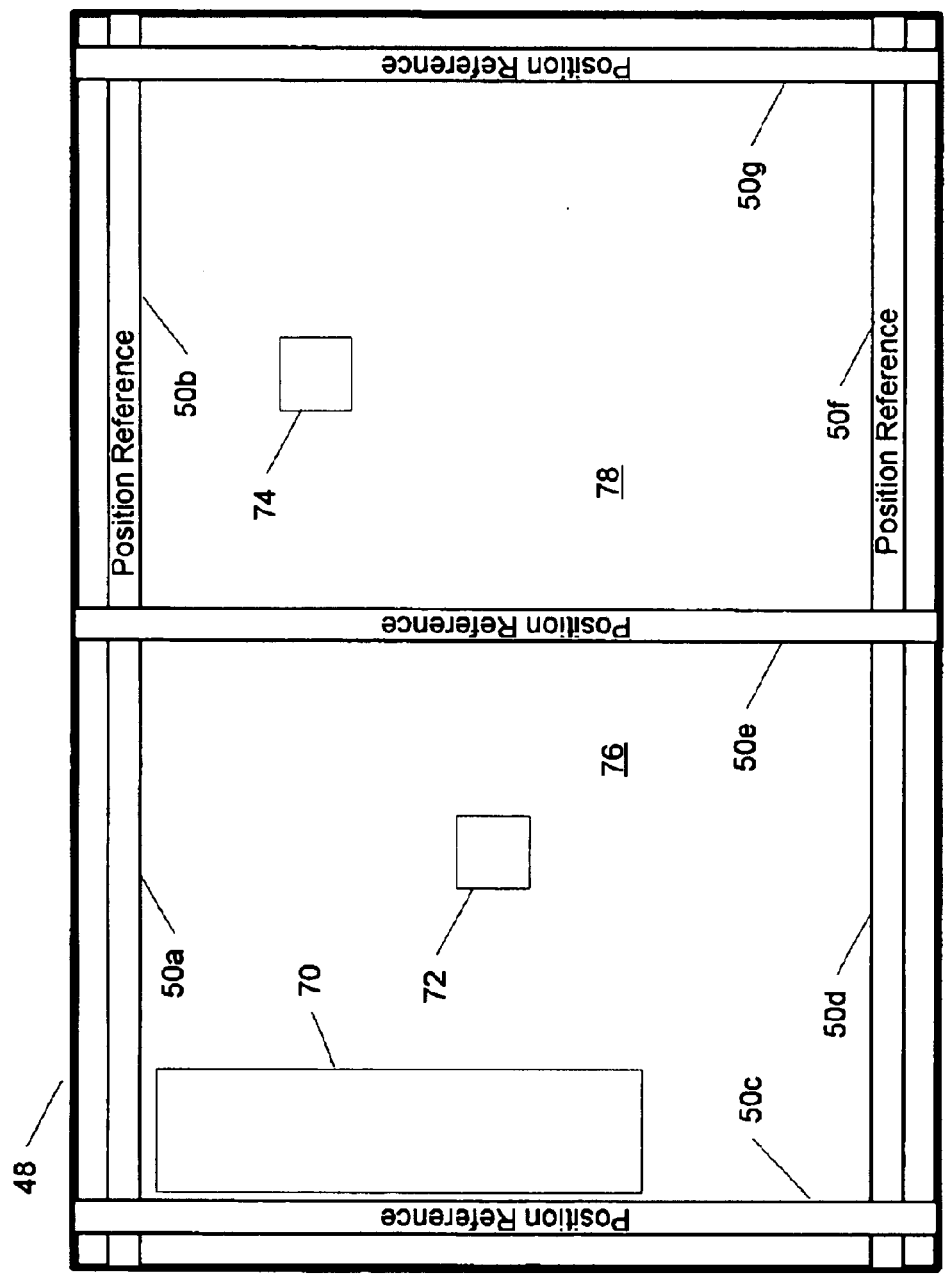
FIG. 2 is a plan view of an exemplary magnetically attractive surface used as part of the material transportation system of FIG. 1.

Referring now to FIG. 2, in which like elements of FIG. 1 are shown having like reference designations, an exemplary magnetically attractive surface 48 is comprised of a magnetically attractive material or materials that can include, but are not limited to, steel and magnetically attractive stainless steel. The magnetically attractive surface 48 includes a plurality of position references 50a–50g. In this exemplary embodiment, the reference indicators 50 are generally denoted 50 arranged as strips in polygonal shapes, here shown as rectangles. Those of ordinary skill in the art should appreciate, however, that the reference indicators can be disposed in any desirable pattern or shape including irregular patterns or shapes. The particular pattern or shape used depends upon a variety of factors, including but not limited to, the particular application for which the vehicles are being used as well as the particular pattern, shape or layout in which the magnetic surface 48 is provided.

Material transportation vehicles 72, 74, can be the same as or similar to the material transportation vehicle 12 of FIG. 1, each having a position reference reader (not shown) that can be the type of position reference reader 32 shown in FIG. 1. Thus the material transportation vehicles 72, 74 can read position information provided by the position reference indicators 50a–50g upon passing over them. The position reference indicators 50a–50g are encoded with position information corresponding to position on the magnetically attractive surface 48. However, in an alternate embodiment, the position reference indicators 50a–50g are encoded with information that the one or more material transportation vehicles 72, 74 can interpret with look-up tables or the like to be position information.

In one particular arrangement, the position reference indicators 50a–50g are bar code strips and the one or more position reference readers (e.g., 32, FIG. 1) are bar code readers. However, in other arrangements, other types of position reference indicators and position reference readers can be used, including, but not limited to, inductive position references and inductive position reference readers. Also, in other arrangements, the position references are arranged at discrete locations rather than in strips. In another alternate arrangement, locations of the one or more material transportation vehicles are provided by a material tracking system 68 (FIG. 1). The material tracking system 68 may be provided, for example, as a hospital management system associating material location, origin, destination, expiration, patient, physician, etc. and the material information can be queried from any vehicle via the communication link (e.g. communication link 57 in FIG. 1).

In one particular embodiment, the material transportation vehicles 72, 74 are powered by a rechargeable power sources (e.g. rechargeable batteries, not shown) mounted on the vehicles 72, 74. The magnetically attractive surface 48 can also include a docking region 70 that provides a re-charge of power to the power source within a material transportation vehicle when it enters the charging region 70. The re-charge can be accomplished in a variety of ways, including, but not limited to, an inductively coupled power transfer, and a direct contact power transfer. In other embodiments, inductively coupled power transfer can be provided not only in the docking region 70, but also at regions (not shown) of the magnetically attractive surface 48 frequently traversed by the material transportation vehicles 74, 76.

In an alternate arrangement, high capacity capacitors (not shown) are used in place of or in addition to the rechargeable batteries. The capacitors can be charged in the same way that the batteries can be charged, as described above.

Figure 3:
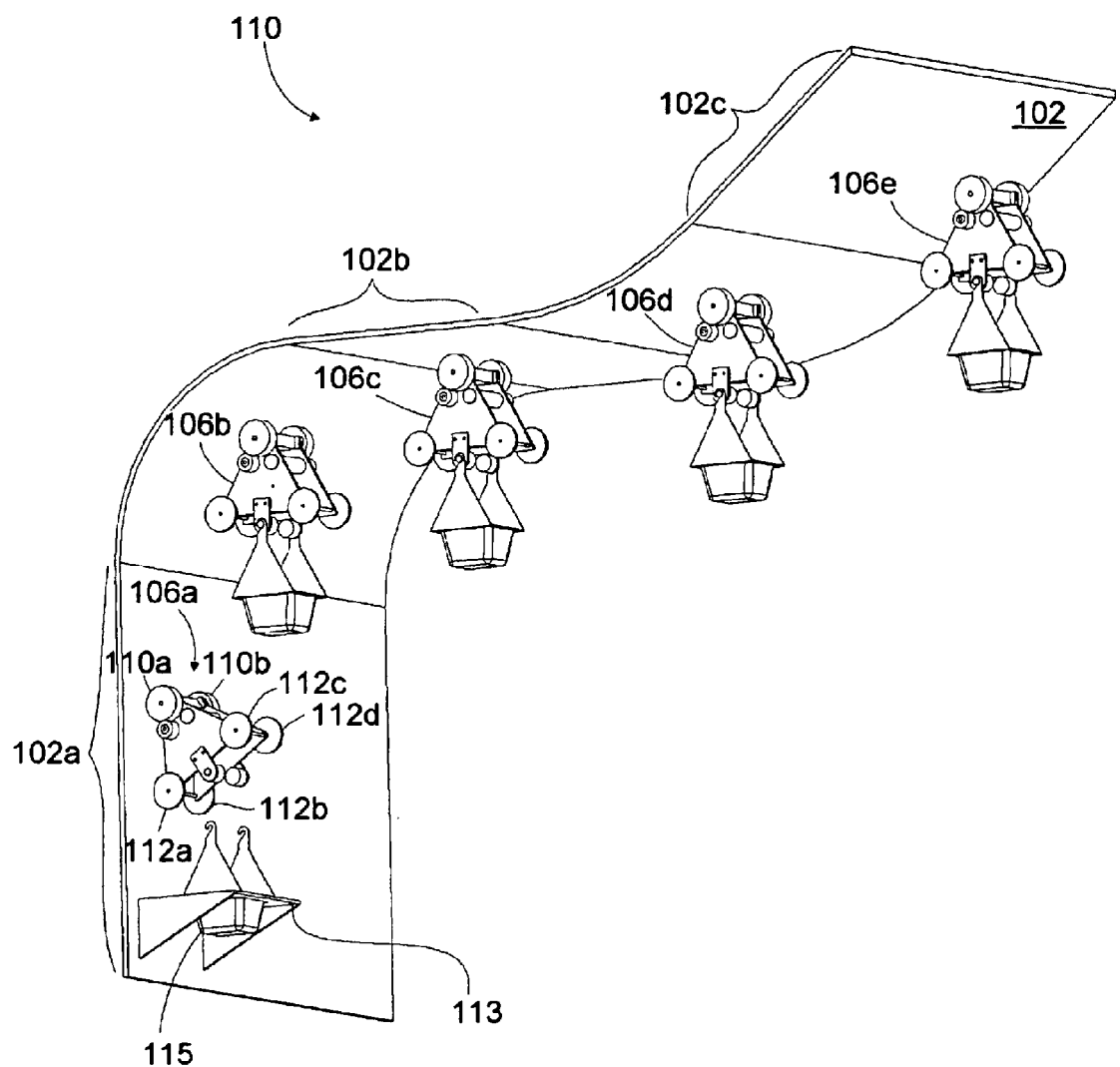
FIG. 3 is an isometric view of an exemplary magnetically attractive surface and material transportation vehicles used as part of the material transportation system of FIG. 1.

Referring now to FIG. 3, a portion 100 of an exemplary material transportation system includes one or more material transportation vehicles 106a–106e generally denoted 106. Taking the material transportation vehicles 106a, as representative of all such material transportation vehicles, the material transportation vehicle 106a can move both vertically upon a first portion 102a of the magnetically attractive surface 102 and horizontally upon a second portion 102b of the magnetically attractive surface 102, and upon a third inclined portion 102c (which may, for example, correspond to a ceiling of a stairway) of the magnetically attractive surface 102. The material transportation vehicle 106a includes two driving magnetic wheels 110a, 1110b having permanent magnetism and one or more idler rollers, here four idler rollers 112a–112d. As described above, the magnetically attractive surface 102 is comprised of a magnetically attractive material, for example stainless steel, to which the magnetic wheels 110a, 110b of the material transportation vehicle 106a are attracted. Thus, the material transportation vehicle 106a, when passing along the magnetically attractive surface 102, is coupled thereto by the magnetic attraction. In some embodiments, it may be preferable if at least one of the attractive surface 102 or the wheels 110a, 110b has disposed thereon a traction-enhancing feature such as a rubber coating, a rubber tire or an O-ring.

When the material transportation vehicle 106a passes along the portions 102b and 102c of the magnetically attractive surface 102, none of the idler rollers 112a–112d contacts the magnetically attractive surface.

However, when the material transportation vehicle 106a passes along the first portion 102a of the magnetically attractive surface 102, some of the one or more rollers 112a–112d are in contact with the magnetically attractive surface 102. For example, shown here, two rollers 112a–112b of the material transportation vehicle 106a are in contact with the magnetically attractive surface 102. The idler rollers 112a–112d can be non-magnetic.

In operation, when the material transportation vehicle 106a moves along the third portion 102c of the magnetically attractive surface 102, the third portion 102c being at an orientation angle that does not allow the one or more rollers 112a–112d to contact the magnetically attractive surface if they are non-magnetic, the material transportation vehicle 106a has a tendency to swing about an axis connecting the two magnetic wheels 110a, 110b. However, when the material transportation vehicle 106a moves along the first portion 102a of the magnetically attractive surface 102, the first portion 102a being at an orientation angle that allows the one or more rollers 112a–112b to contact the magnetically attractive surface 102, the material transportation vehicle 106a does not swing, since the swing is retarded by the rollers 112a–12b.

Hereafter, the first portion 102a and the second portion 102b, and the third portion 102c of the magnetically attractive surface 102 are referred to as a magnetically attractive wall 102a, a magnetically attractive ceiling 102b respectively, and a magnetically attractive incline 102c, or simply a wall 102a, ceiling 102b, and an incline 102c. It will be understood that the magnetically attractive wall need not be vertical and the magnetically attractive ceiling need not be horizontal. Instead, the magnetically attractive wall is distinguished from the magnetically attractive ceiling wherein the one or more rollers 112a–112d contact the magnetically attractive wall and the one or more rollers 112a–112d do not contact the magnetically attractive ceiling. With the wall and the ceiling thus distinguished, it will be apparent that the range of wall orientation angles and the range of ceiling orientation angles depend on the geometric configuration of both the material transportation vehicle 106, 108 and the one or more rollers 112a–112d.

The wall 102a includes a payload transfer station 113. While only one payload transfer station is shown in FIG. 3, it should be appreciated that system 100 can include a plurality of payload transfer stations. The payload transfer station 113 is used by vehicles (e.g. vehicle 106a in FIG. 3) to load and/or unload a material payload 115. The load and/or unload operations can be manual, machine assisted or automatic or the load and/or unload operations can be combination of manual, machine assisted or automatic (e.g. some payload transfer stations may be fully or partially manual while other payload transfer stations may be fully or partially automatic). While only one material transportation vehicle 106a is shown to be loading and unloading from the payload transfer station 113, it should be understood that others of the material transportation vehicles can also load and unload material at the same payload transfer station 113 or at other payload transfer stations.

While a smooth transition between the wall 102a and the ceiling 102b is shown, it should be understood that the material transportation vehicle 108, having only the two magnetic wheels 110a, 110b, can also traverse between a wall and a ceiling with small discontinuities between sections, as long as the wheels can bridge the discontinuities.

In operation, as the material transportation vehicle 108 moves along the ceiling 102b or the incline 102c, the swing motion can be controlled by controlling the spin of the two magnetic wheels 110a–110b. Thus, the material transportation vehicle 108 can dynamically suppress the swing motion. Swing motion and swing motion control are further described below.

The system can also include safety measures including but not limited to grids, nets, tethers which can be used to catch or prevent the vehicles from falling. The system can also include overload sensors to limit the acceleration/speed of the vehicle, adjusting the performance of the vehicle controllers to enhance safety, depending upon a variety of factors including but not limited to weight, performance constraints and obstacles.

Figure 4:
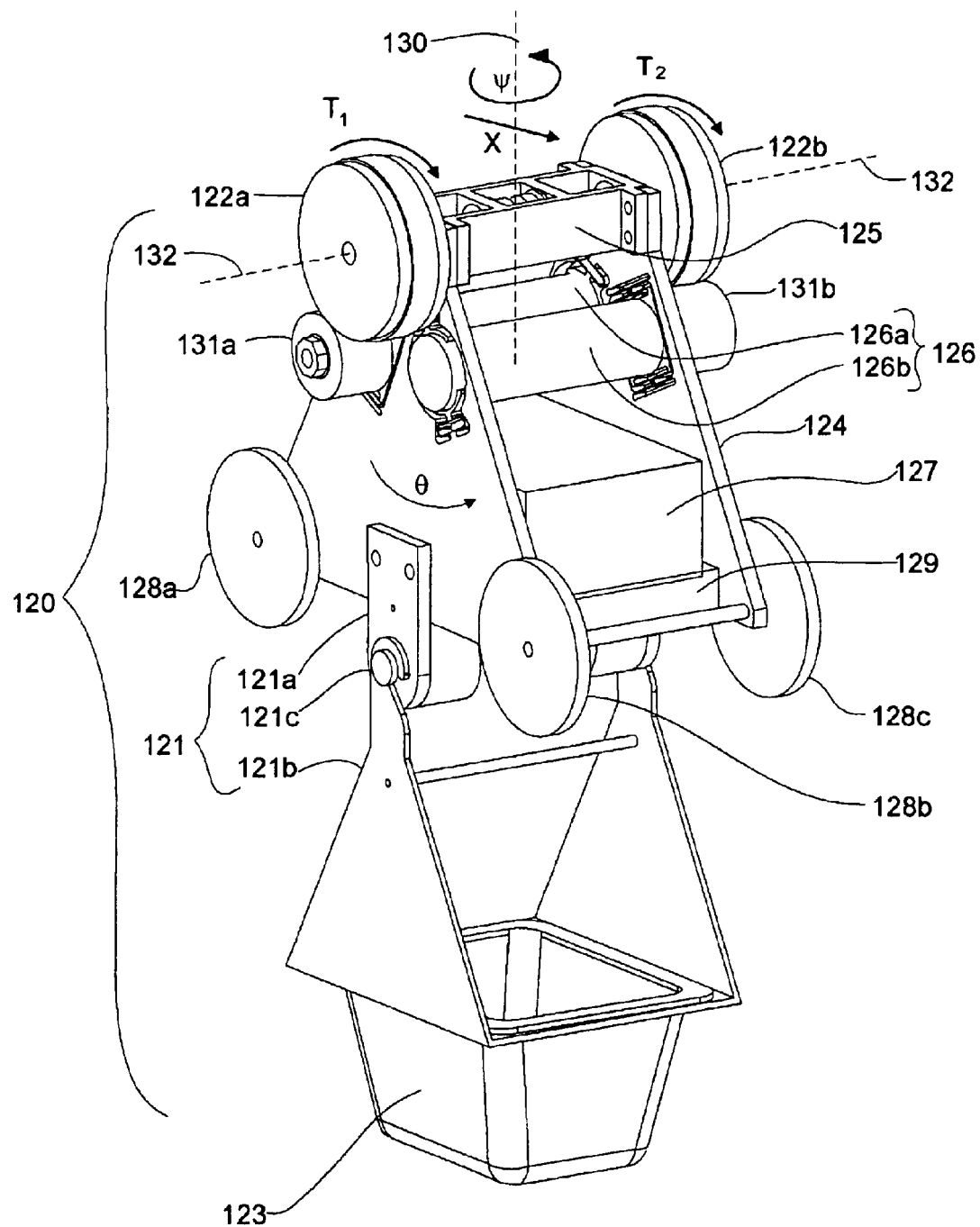
FIG. 4 is an isometric view an exemplary material transportation vehicle and material payload used as part of the material transportation system of FIG. 1.

Referring now to FIG. 4, an exemplary material transportation vehicle 120, a mechanical interface 121 and a payload 123 are shown. The material transportation vehicle 120 includes a chassis 124, which constitutes the frame of the vehicle. Two magnetic driving wheels 122a and 122b are coupled to the vehicle chassis 124 by means of a wheel bearing 125. Each of the magnetic wheels 122a, 122b is also coupled by means of first and second friction drives 131a, 131b to a wheel motor assembly 126, which includes first and second wheel motors 126a, 126b. The wheel motors 126a, 126b can each include a gearbox (not shown). The wheel motor assembly 126 provides independent spin control of the two magnetic wheels 122a, 122b. In other embodiments, it should be understood that a timing belt drive, geared drive, or a direct drive may also be used in place of the friction drives 131a, 131b.

In operation, the independent spin control allows each of the two magnetic wheels 122a, 122b to spin at a different spin rate and/or direction or at the same spin rate and/or direction. Therefore, the independent spin control allows the material transportation vehicle 120 to turn in a rotation $\Psi$ about an axis 130.

The material transportation vehicle 120 also includes four idler rollers 128a–128d (128d not shown). The material transportation vehicle 12D also includes motor amplifiers (not shown), a battery 127 to power the material transportation vehicle 120, and a vehicle computer 129. The vehicle computer 129 can be the same as or similar to the vehicle computer 18 of FIG. 1.

The material transportation vehicle 120 is coupled to a material payload 123 by means of a mechanical interface 121. The mechanical interface 121 includes a payload receiver 121a, which is attached to the vehicle chassis 124, and a payload carrier 121b, which is attached to the payload 123. The mechanical interface 121 also includes a coupling 121c, which is adapted to allow the payload carrier 121b to be engaged and disengaged with respect to the payload receiver 121a. When engaged, the payload carrier 121b cannot rotate relative to the payload receiver 121a, and when disengaged, the payload carrier 121b can rotate relative to the payload receiver 121a. The payload carrier 121b can be engaged at any angle relative to the payload receiver 121a.

In one particular arrangement, the engaging and disengaging allows for loading and unloading of the material payload 123. For example, while the material transportation vehicle 120 carrying the material payload 123 moves on a ceiling (e.g., 102b, FIG. 3), the mechanical interface 121 can be engaged or locked so that the payload carrier 121b cannot swing or otherwise move relative to the payload receiver 121a. When moving in a transition region from a ceiling to a wall, the mechanical interface 121 can be disengaged so that the payload carrier 121b remains substantially vertically oriented as the material transportation vehicle 120 tilts in response to the idler rollers touching the wall (see FIG. 3). When leaving the transition region to move on a wall (e.g., 102a, FIG. 3) the mechanical interface 121 can be engaged so that the payload carrier 121b remains in the substantially vertical orientation until the material transportation vehicle 120 reaches a payload transfer station (e.g. 113, FIG. 3). For unloading the payload, the mechanical interface 121 can be disengaged, and after a new payload 123 has been loaded into the payload carrier 121b, the mechanical interface 121 can be re-engaged. When disengaged, the payload carrier 121b can also be manually or automatically de-coupled from the payload receiver 121a.

In one particular embodiment, the engagement and disengagement can achieved by means of a friction clutch (not shown). However, in alternate embodiments, any mechanical interface design, active or passive, which can achieve engagement and disengagement, may be used. In other alternate embodiments, the mechanical interface can be either permanently engaged or permanently disengaged.

In operation, the material transportation vehicle 120, having the two magnetic wheels 112a, 112b, each with independent spin control, has rotation or directional steering in addition to the swing motion control described herein.

The material transportation vehicle 120 can move in translation along one degree of freedom along a magnetically attractive surface (wall, ceiling, or floor) to which is it magnetically attached and can rotate, or steer in a second degree of freedom. The two independently driven magnetic wheels 122a, 122b allow for turns having a very small or no turning radius.

When moving on a ceiling, the two-wheel material transportation vehicle 120 design results in a pendulum like swinging of the chassis 124 and therefore of material 123 coupled to the material transportation vehicle 120. The material transportation vehicle 120 has little "kinematic pitch stiffness", i.e., nominally the material transportation vehicle 120 has little motion resistance about and axis of rotation 132 of the two magnetic wheels 122a, 122b. The swinging, however, is reduced by means of control of the motor assembly 126 by the vehicle computer 129, which executes the pitch motion controller 22, of FIG. 1. Thus, in the absence of kinematic pitch stiffness, "dynamic pitch stiffness" is provided by using spin control of the two magnetic wheels 122a, 122b. Angle sensors (not shown), which sense an angle $\theta$ and are described more fully below, provide feedback to the vehicle computer 129, which accordingly drives the motor assembly 126 to control the swing.

Referring now to FIG. 5, an exemplary magnetic wheel 160, part of a material transportation vehicle 161, can be the type of magnetic wheels 36, 40 described above in conjunction with FIGS. 1, 3 and 4. The magnetic wheel 160 is comprised of a solid disk of permanently magnetic material, for example ferrite, alnico, or bonded Neodymium-Iron-Boron. When coupled to a magnetically attractive surface 166, e.g. the magnetically attractive surface 102 of FIG. 3, the magnetic wheel 160 generates a magnetic field having a magnetic flux density represented approximately by magnetic field lines 162. Tightly spaced magnetic field lines correspond to a strong attractive force between the magnetic wheel 160 and the magnetically attractive surface 166.

The magnetically attractive surface 166 can have a traction surface 164 that increases the traction between the magnetic wheel 160 and the magnetically attractive surface 166. The traction surface 164 can be comprised of serrations on the magnetically attractive surface 166, a rubber layer on the magnetically attractive surface 166, or any other traction generating means.

In an alternate embodiment, in place of or in addition to the traction surface 164, a rolling surface 160a of the magnetic wheel 160 can be covered with a traction material, for example rubber, to increase surface traction, provide damping in the presence of any bumps, and reduce noise generated due to surface irregularities.

Referring now to FIG. 5A, another embodiment of a magnetic wheel 180, part of a material transportation vehicle 181, includes a magnetic portion 182 having permanent magnetism, coupled to one or more magnetically attractive disks, here two magnetically attractive disks 184a, 184b. The magnetically attractive disks 184a, 184b can be comprised of a variety of materials, including, but not limited to steel, iron, ferrite, permalloy, and laminated structures comprised of one or more of the aforementioned materials. The diameter of the magnetically attractive disks 184a, 184b is larger than the diameter of magnetic portion 182 so that only the magnetically attractive disks 184a, 184b are in contact with a magnetically attractive surface 190. The magnetically attractive disks 184a, 184b concentrate the magnetic flux 183 by providing a low reluctance path, thus improving the attractive force between the magnetic wheel 180 and the magnetically attractive surface 190. The magnetic wheel 180 assures a high attractive force between the magnetic wheel 180 and the magnetically attractive surface 190.

In one particular embodiment, a rare-earth permanent magnet such as a Neodymium-Iron-Boron based magnet that has a high flux density can be used as the magnetic portion 182. The wheel is designed to provide force necessary to hold the vehicle and payload, plus a factor of safety, as well as sufficient traction to climb a vertical section. In one embodiment, the magnetic wheel 180 can provide approximately fifty pounds of attractive force.

Similar to the traction surface 164 of FIG. 5, the magnetically attractive surface 190 can have a traction surface 186 that increases the traction between the magnetic wheel 180 and the magnetically attractive surface 190. However, it should be recognized that the high attractive force between the magnetic wheel 180 and the magnetically attractive surface 190 provided by this particular alternate embodiment generates substantial traction even in the absence of the traction surface 186.

In another embodiment, in place of or in addition to the traction surface 186, a rolling edge 184c, 184d of each of the magnetically attractive disks 184a, 184b can be covered with a traction material, for example rubber, to increase surface traction, provide damping in the presence of any bumps, and eliminate noise generated due to surface irregularities.

In yet another alternate embodiment, an electromagnet is used in place of the magnetic portion 182. The electromagnet is provided with a power supply.

While the magnetic wheels 160, 180 having permanent magnetism are shown in FIGS. 5 and 5A, in an alternate embodiment, the magnetically attractive surface, e.g. the magnetically attractive surface 166, 190, has permanent magnetism and the magnetic wheel 160, 180 has no permanent magnetism, instead being attracted to the permanent magnetism of the magnetically attractive surface 166, 190.

Referring to FIG. 4 again, to understand the swing motion control of the material transportation vehicle, for example the material transportation vehicle 120, the vehicle 120 is shown having three position coordinates, also known as degrees of freedom, i.e., translation x, steer $\Psi$, and swing $\theta$. In a mathematical sense, translation x and steer $\Psi$ can easily be decoupled from each other by means of a linear transformation. In a linearized model, swing $\theta$ is coupled only to translation x and not the steer $\Psi$. Hence for the purpose of studying the swing control, it shall suffice only to consider a two dimensional model, or a model with two position coordinates x and $\theta$. Control of steer $\Psi$ can be studied as a separate problem.

Figure 6:
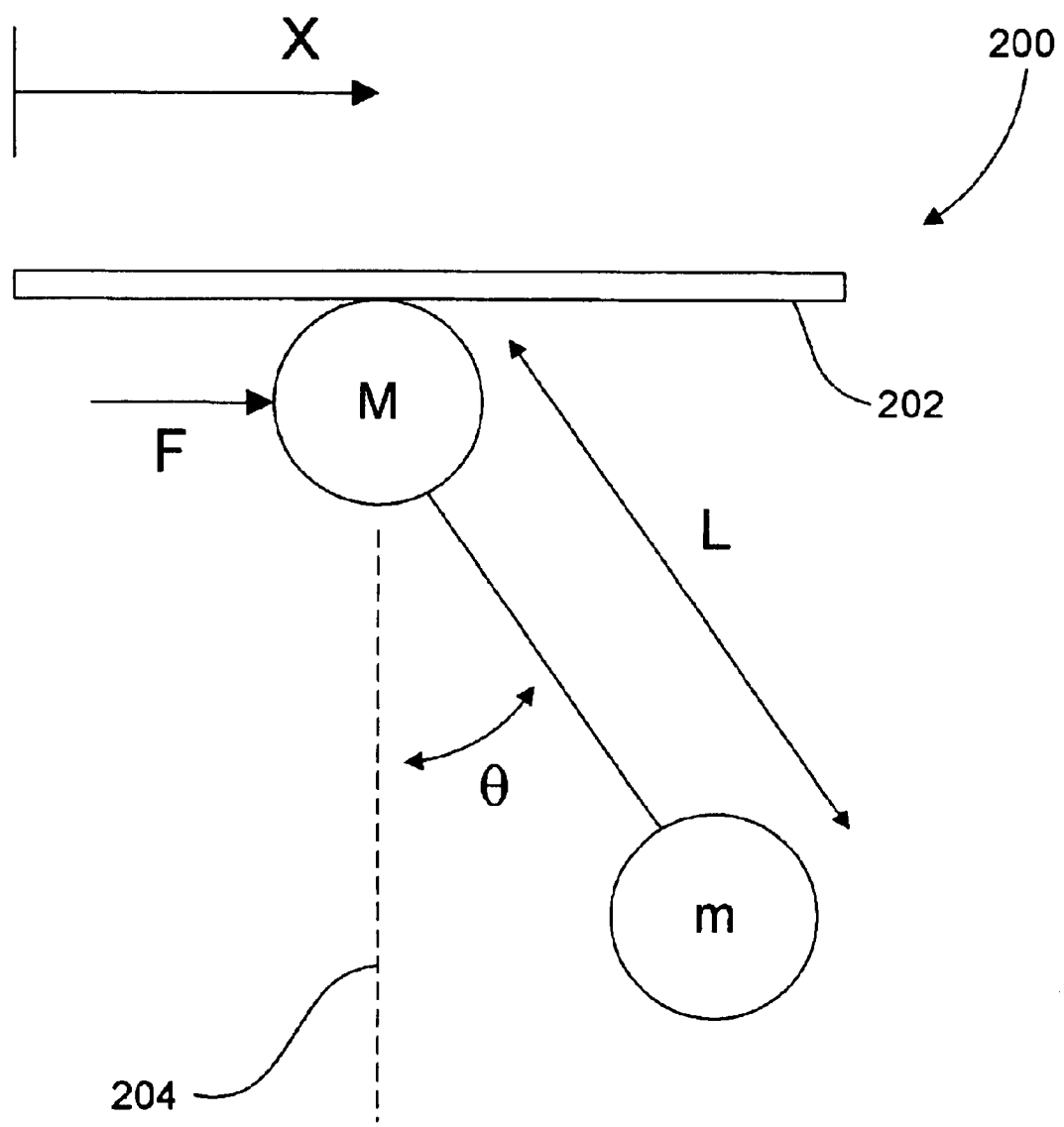
FIG. 6 is a line pictorial showing certain parameters required for the pitch motion control analysis of the material transportation vehicle of FIG. 4.

Referring now to FIG. 6, a two dimensional model is shown to explain the swing control. Here, the surface 202 corresponds to a magnetically attractive surface, e.g. the magnetically attractive surface 102 of FIG. 3. A mass, M, corresponds to a mass of the two magnetic wheels, for example the two magnetic wheels 122a, 122b of FIG. 4. A mass, m, corresponds to a mass of the rest of the material transportation vehicle, for example, the chassis 124, the motor assembly 126, the rollers 128a, 128d, the mechanical interface 121, and the payload 123 of FIG. 4. The mass m is at a corresponding center of gravity a distance L from the magnetic wheels. A force F corresponds to the force generated by the motor assembly 126 in spinning the magnetic wheels to accelerate the material transportation vehicle. Coordinates x and $\theta$ are as defined for FIG. 4.

The equations of motion for this two-dimensional physical model are given below:

$$\ddot{x} \cos \theta + L[\$/\$\text{''}g\ddot{v} + g \sin \theta = 0$$

$$(m+M)\ddot{x} + mL[\$/\$\text{''}g\ddot{v} = F$$

Linearization about the operating equilibrium yields:

$$\frac{X}{F} = \frac{Ls^2 + g}{s^2[MLs^2 + (m+M)g]}$$

$$\frac{\Theta}{F} = \frac{-1}{MLs^2 + (m+M)g}$$

In the above equations, the constant g corresponds to the acceleration due to gravity. For swing control of the pendulum mode described above, g is positive. For balance control of the inverted pendulum mode described above, g is negative. These transfer functions show that controlling the linear travel x and swing angle $\theta$ by means of the driving force F constitutes a problem somewhat similar to the conventional problem of collocated and non-collocated controls. A control system for this problem can be designed. The control problem has conflicting objectives. First, the control must maintain the swing angle $\theta$ close to zero, and at the same time the control must achieve translation motion control in the direction of x, using the same input force F. Thus, the swing and translation control is a multivariable control design problem and can be treated independent of the steer control problem.

Now returning to the three dimensional case of FIG. 4, the vehicle 120 has three degrees of freedom and hence six states. The six states include translation in x, yaw angle or rotation $\Psi$, swing $\theta$, and their respective derivatives. Each of these states can be measured by means of appropriate sensors, for example, optical encoders, inclinometers, rate gyroscopes, accelerometers. The system inputs are in the form of torque generated by two wheel motors 126a, 126b. Feedback can be implemented to control all of the states of the system. The three degrees of freedom of the material transportation vehicle are controlled to obtain the desired system performance. Controlling x produces the desired translation of the material transportation vehicle. This coupled with control of $\Psi$ produces steering about the axis 130. Finally, controlling $\theta$ to substantially zero keeps the vehicle swing substantially small. Thus using six sensors (e.g., sensor system 16, FIG. 1), two actuators (e.g., wheel motors 34, 38, FIG. 1), and a multivariable controller (e.g., vehicle computer 18, FIG. 1), all the states of the system can be controlled. However, in other embodiments, fewer than six sensors can be used so long as the fewer than six sensors provide 6 outputs, some of which can be estimated from the fewer than six sensors.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A material transportation vehicle for use on a surface of a magnetically attractive pathway, the material transportation vehicle comprising:
   a friction drive, including:
      a first axle having an axis;
      a wheel having an outer surface, the wheel having a magnetic characteristic such that the wheel is provided as a magnetic wheel, wherein said magnetic wheel is supported by the first axle;
      a second axle having an axis, wherein the first and second axles are disposed such that the axis of said first axle is generally parallel to the axis of said second axle; and
      a drive cylinder supported by the second axle, the drive cylinder having a surface coupled to the outer surface of the magnetic wheel with the drive cylinder provided from a material such that there is a magnetic attraction between the surface of the drive cylinder and the outer surface of the magnetic wheel, and wherein the magnetic wheel is adapted to rotate about the taxis of the axle in response to a rotation of the drive cylinder about the axis of the second axle.

2. The material transportation vehicle of claim 1, wherein at least one of the first axle and the second axle is adapted to move in response to the magnetic attraction in a direction generally perpendicular to the axis of the first axle and to the axis of the second axle to bring an outer surface of the drive cylinder into contact with the outer surface of the magnetic wheel.

3. The material transportation vehicle of claim 1, further including a motor assembly coupled to the drive cylinder to generate the rotation of the drive cylinder about the axis of the second axle.

4. The material transportation vehicle of claim 1, wherein the magnetic wheel comprises one magnetic metal disk.

5. The material transportation vehicle of claim 1, wherein the magnetic wheel comprises two magnetic metal disks.

6. The material transportation vehicle of claim 1, wherein the outer surface of the magnetic wheel includes a traction surface to increase surface traction of the magnetic wheel.

7. The material transportation vehicle of claim 1, wherein the first axle is supported by a first bearing to a first structure and the second axle is supported by a second bearing to a second structure, wherein at least one of the first structure and the second structure is adapted to move in response to the magnetic attraction in a direction generally perpendicular to the axes of the first and second axles to bring the drive cylinder into contact with the outer surface of the magnetic wheel.

8. The material transportation vehicle of claim 1, wherein the magnetic wheel is provided having a magnetic field strength which is sufficient to hold the material transportation vehicle in contact with the surface of the magnetically attractive pathway.

9. The material transportation vehicle of claim 8, wherein the magnetic wheel is provided having a magnetic field strength which is sufficient to hold the material transportation vehicle in suspension beneath the surface of the magnetically attractive pathway.

10. The material transportation vehicle of claim 1, wherein the friction drive further comprises:
   a second magnetic wheel supported by a third axle having an axis; and
   a second drive cylinder having an axis, the axis of the third axle generally parallel to the axis of the fourth axle, the second drive cylinder having magnetic attraction to and in contact with the second magnetic wheel, wherein the second magnetic wheel is adapted to rotate about the taxis of the third axle in response to a rotation of the second drive cylinder about the axis of the fourth axle.

11. An apparatus comprising:
   (a) a wheel having an outer surface and an axis about which said wheel rotates, said wheel comprising:
      (1) first and second metal disks; and
      (2) one or more magnets disposed between said first and second metal disks to provide said wheel having a magnetic attractive force;
   (b) a first shaft disposed to support said wheel;
   (c) a shaft support structure;
   (d) one or more bearings disposed in said shaft support structure and coupled to support said first shaft;
   (e) a second shaft;
   (f) a cylinder having an axis about which said cylinder rotates, said cylinder supported by said second shaft and disposed such that the axis of said cylinder is substantially parallel to the axis of said wheel and such that the magnetic attractive force causes the outer surface of the wheel to be attracted to and in contact with the cylinder; and
   (g) a substructure coupled to said support structure;
   (h) one or more bearings disposed in said substructure and coupled to said second shaft such that the axis of the cylinder is free to move so the distance between the axis of rotation of the wheel and the axis of the cylinder can vary, thereby allowing the magnetic attractive force between the wheel and the cylinder to preload the wheel and the cylinder together.

12. The apparatus of claim 11 further comprising a motor disposed to drive the cylinder and the wheel to cause motion of the apparatus.

13. The apparatus of claim 11, wherein the outer surface of said wheel corresponds to a rolling surface of said wheel.

14. The apparatus of claim 13, wherein the rolling surface of said wheel includes a traction surface to increase surface traction of said wheel.

* * * * *

UNITED STATES PATENT AND TRADEMARK OFFICE
CERTIFICATE OF CORRECTION

PATENT NO. : 6,886,651 B1
DATED : May 3, 2005
INVENTOR(S) : Slocum et al.

It is certified that error appears in the above-identified patent and that said Letters Patent is hereby corrected as shown below:

Column 3,
Line 42, delete "view an" and replace with -- view of an --.

Column 8,
Line 1, delete "vehicles 12" and replace it with -- Vehicle 12 --.

Column 9,
Line 15, delete "sources" replace it with -- source --.
Line 44, delete "1110b" replace it with -- 110b --.

Column 10,
Line 18, delete "112a-12b." replace it with -- 112a-112b. --.
Lines 44-45, delete "can be combination" replace it with -- can be a combination --.

Column 11,
Line 33, delete "12D" replace it with -- 12o --.

Column 12,
Line 9, delete "can achieved" replace it with -- can be achieved --.
Line 21, delete "which is it" replace it with -- which it is --.

Column 14,
Lines 18-19, delete
$$\ddot{x}\cos\theta + L[lS]\ddot{S}\,g\ddot{v} + g\sin\theta = 0$$
$$(m+M)\ddot{x} + mL[lS]\ddot{S}\,g\ddot{v} = F$$

and replace it with --
$$\ddot{x}\cos\theta + L\ddot{\theta}\,g\sin\theta = 0$$
$$(m+M)\ddot{x} + mL\ddot{\theta} = F\,\text{--}.$$

Column 15,
Line 31, delete "the taxis of the axle" replace it with -- the axis of the first axle --.

UNITED STATES PATENT AND TRADEMARK OFFICE
CERTIFICATE OF CORRECTION

PATENT NO. : 6,886,651 B1
DATED : May 3, 2005
INVENTOR(S) : Slocum et al.

It is certified that error appears in the above-identified patent and that said Letters Patent is hereby corrected as shown below:

Column 16,
Line 18, delete "the taxis" replace it with -- the axis --.

Signed and Sealed this

Twenty-ninth Day of November, 2005

JON W. DUDAS
*Director of the United States Patent and Trademark Office*